| United States Patent [19] | [11] Patent Number: 5,032,291 |
| Sublette | [45] Date of Patent: Jul. 16, 1991 |

[54] CATALYTIC REDUCTION OF NITRO- AND NITROSO- SUBSTITUTED COMPOUNDS

[75] Inventor: Kerry L. Sublette, Tulsa, Okla.

[73] Assignee: ABB Environmental Services Inc., Portland, Me.

[21] Appl. No.: 542,101

[22] Filed: Jun. 22, 1990

[51] Int. Cl.$^5$ ............................................. C02F 1/70
[52] U.S. Cl. ................................. 210/757; 210/903; 405/128; 423/DIG. 20
[58] Field of Search ............... 210/757, 903; 405/128; 423/DIG. 20

[56] References Cited

U.S. PATENT DOCUMENTS 4,219,419  8/1980  Sweeny ............................... 210/754
4,323,515  4/1982  Cognion et al. ..................... 560/342

FOREIGN PATENT DOCUMENTS 8810944  5/1988  United Kingdom .

Primary Examiner—Peter Hruskoci
Assistant Examiner—Krisanne Shideler
Attorney, Agent, or Firm—Elliot M. Olstein; Raymond J. Lillie

[57] ABSTRACT

A process is disclosed for treating water or solids contaminated with a nitro- or nitroso- substituted compound comprising reducing a nitro- or nitroso- substituted compound in the presence of an effective catalytic amount of at least one of a corrin- or porphyrin- metal complex. The present invention is particularly useful in treating waste water or soil contaminated with nitro- or nitroso- substituted compounds.

17 Claims, No Drawings

CATALYTIC REDUCTION OF NITRO- AND NITROSO- SUBSTITUTED COMPOUNDS

This invention relates to the reduction of nitro and/or nitroso substituents of organic molecules to amino substituents. More particularly, this invention relates to the reduction of such nitro and nitroso substituents to amino substituents in the presence of a catalyst comprising a metal ion and a complexing agent.

Nitrosubstituted organic compounds are commonly associated with dye, pesticide, and munitions wastes. Such compounds are environmentally persistent and toxic, especially to marine life.

For example, during the processing of trinitrotoluene (TNT), about 4.5% of the crude product comprises objectionable unsymmetrical TNT isomers which must be removed to achieve suitable properties for military use. The removal of such isomers is done typically by treatment of the crude product with aqueous sodium sulfite. The sodium sulfite reacts with unsymmetrical TNT isomers to produce water soluble sulfonates are removed with the spent sulfite solution. The sulfonated nitrobodies in the waste water stream are highly toxic, and when dry, can represent an explosion hazard.

In accordance with an aspect of the present invention, there is provided a process for treating water or solids contaminated with at least one nitro- or nitroso-substituted compound comprising reducing the at least one nitro- or nitroso-substituted compound in the presence of an effective catalytic amount of at least one of a corrin- or porphyrin- metal complex. In one embodiment, the metal portion of the complex may be a metal ion selected from Group IIa, Group IIIa, Group IVa, Group Va, Group VIa, Group VIIa, Group VIII, Group Ib, Group IIb, or Group IIIb, or the Lathanide or Actinide Series of the Periodic Table. Preferably, the metal ion which is complexed in the catalyst may be selected from the group consisting of $Co^{+2}$, $Fe^{+3}$, $Fe^{+2}$, $Ni^{+2}$, $Mo^{+3}$, $V^{+5}$, $Ca^{+2}$, $Ba^{+2}$, $Sr^{+2}$, $Cr^{+3}$, $Cr^{+5}$, $Mn^{+2}$, and $Zn^{+2}$. The complexed metal ion may also be complexed with an additional ligand. The ligand may be an anion such as cyanide, sulfite, phosphate, thiocyanate, thiosulfate, or perchlorate. The ligand also may be a polar neutral molecule such as CO or $H_2S$.

Porphyrins and corrins are large, cyclic, metal-chelating molecules of similar structure, with porphyrins containing the ring system (1), and corrins containing the ring system (2):

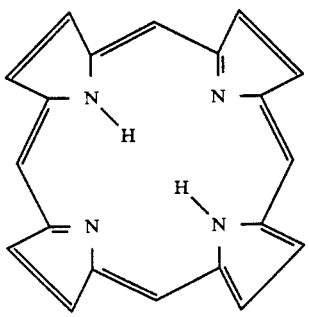

(1)

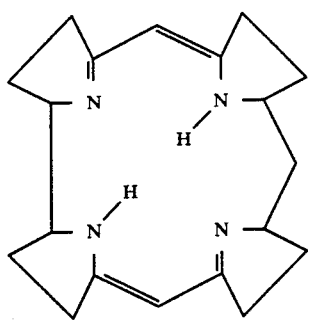

(2)

In these systems the two 'central' hydrogen atoms bonded to the nitrogen may be replaced by a single coordinated metal ion to form complexes of the structures (1A) and (2A) below, where M is a metal ion:

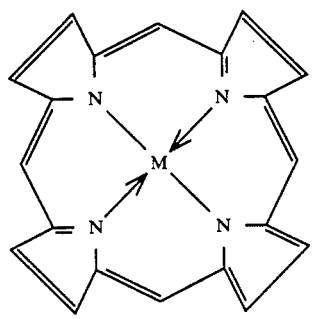

(1A)

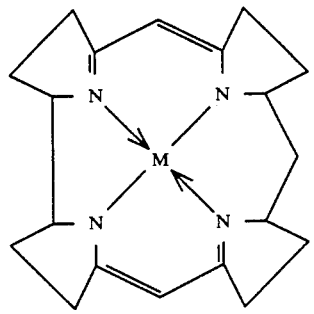

(2A)

Substituent groups may also be present on the peripheral substitution positions of these ring systems, and the metal ion M may be coordinated to additional ligands such as those hereinabove described.

The porphyrin may include —COOH groups or other polar ionizable functional groups on the periphery of the porphyrin ring or, alternatively, one or more of the —COOH groups on the porphyrin ring may be replaced by —$COONR_1R_2$ groups where $R_1$ and $R_2$ are independently alkyl or hydrogen, or salts thereof with a counter cation. The introduction of other functional groups onto the periphery of the porphyrin ring for the purpose of changing solubility properties, facilitating immobilization on a solid support or binding to soils or other natural solid substrates is included within the scope of the present invention.

Porphyrins and corrins are found in nature; for example, hemoglobin and chlorophyll, where M is iron and magnesium respectively, are porphyrins. Corrins are for example found in nature as vitamins B12 (cyanocobalamin), B12b (hydroxocobalamin) and B12c (nitrosocobalamin), each of which contains a cobalt ion at the ring centre.

Cyanocobalamin, for example, is of the following structure:

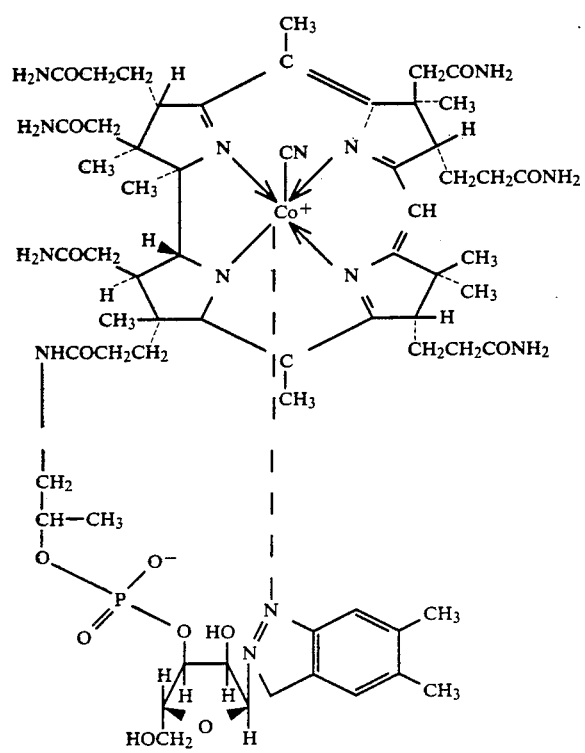

Porphyrins which may be employed include hematoporphyrin, protoporphyrin, uroporphyrin, and coproporphyrin.

Metal ions which may be complexed with the porphyrins or corrins hereinabove described include those selected from Group IIa, Group IIIa, Grou IVa, Group Va, Group VIa, Group IIa, Group VIII, Group Ib, Group IIb, Group IIIb, or the Lanthanide or Actinide Series of the Periodic Table. Particularly preferred metal ions are those selected from the group consisting of $Co^{+2}$, $Fe^{+3}$, $Fe^{+2}$, $Ni^{+2}$, $Mo^{+3}$, $V^{+5}$, $Ca^{+2}$, $Ba^{+2}$, $Sr^{+2}$, $Cr^{+3}$, $Cr^{+5}$, $Cu^{+2}$, $Mn^{+2}$, and $Zn^{+2}$, with $Co^{+2}$ being particularly preferred.

Particularly preferred catalysts are complexes of hematoporphyrin with cobalt. The chelated, or complexed $Co^{+2}$ ion may be additionally complexed with a ligand comprising an anion or polar neutral molecule as hereinabove described.

When a corrin is employed as the complexing agent, the corrin ring may include one or more substituents of the formula $(CH_2CH_2)_n COX$, wherein n is from 0 to 3, and X is —OH, or $NR_1R_2$, wherein $R_1$ and $R_2$ are independently alkyl or hydrogen, and when X is —OH, the —COOH group may be present in an ionized from with a counter cation.

The introduction of any other functional group on the periphery of the carrier ring for the purpose of changing solubility, facilitating immobilization on a solid support or binding to soils or other natural solid substrates is also included within the scope of the present invention.

The porphyrin complexes may be prepared by incubating together in aqueous solution the porphyrin (free of a complexed metal ion) and the metal ion to be complexed, preferably in a equimolar ratio, and with an equimolar amount of the ligand if desired. For coproporphyrin, uroporphyrin, protoporphyrin and hematoporphyrin, a solution of pH 9 (Tris/HCl buffer) and a chloride counter anion for the metal ion is suitable. In the alkaline (pH 9) conditions referred to above, the carboxylic acid groups on the porphyrin substitution positions may be ionized so that the complex may be present in solution as a carboxylate anion.

The corrin complexes may be prepared, for example, by reaction in solution together of the ligand L and a corrinoid precursor containing the following cyanometal-centered ring system:

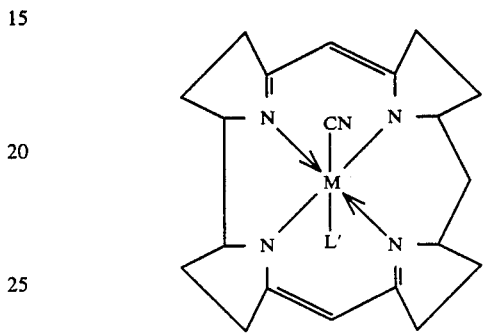

in which L' represents either an unoccupied coordination site on the metal ion, or represents a ligand which may easily be displaced by the ligand L.

In one embodiment, the precursor is cyanocobalamin itself, in which case M is cobalt and the ligand L consists of the residue of the chelating substituent chain of cyanocobalamin shown hereinabove. This chain is easily displaced by ligands such as for example cyanide, perchlorate, thiocyanate, thiosulphate and sulphite. Cyanocobalamin may also be used to prepare precursors of the cyanometal-centered ring hereinabove described, in which M is other than cobalt, by reacting a solution of cyanocobalamin with a chelating ligand which has a stronger affinity for cobalt than the cyanocobalamin residue, such as EDTA, preferably to form an insoluble cobalt-chelating ligand complex which may easily be separated. This leaves a vacant co-ordination site in the centre of the corrin ring into which a metal ion may be inserted by incubating the corrin with a soluble salt of the desired metal (usually a metal chloride). The metal ion may be selected from those hereinabove described. An additional ligand, such as an anion or polar neutral molecule as hereinabove described may be added to the complex by incubating the complex with the anion or polar neutral molecule.

Suitable conditions for preparation of the complex from a corrinoid precursor are reaction of the precursor, for example cyanocobalamin, with an equimolar amount of the ligand (and a suitable counter-ion if necessary, for example an alkali metal) in aqueous solution.

The porphyrin and corrin complexes may be prepared at a temperature of about 37° C. and preferably in the dark. The concentration of porphyrin, metal and ligand (if used), or of corrinoid precursor and ligand do not appear to be critical, but a convenient concentration is about 0.2 mM each. Under these conditions useful amounts of the complex may be formed in about 30 minutes. The complex may then be isolated from solution using conventional methods, or may be stored in solution, preferably in the dark.

In another method of preparation, the porphyrin or corrin complex or the corrinoid precursor may be prepared by a microbiological process; i.e., by culturing a suitable microorganism which produces or secretes the complex or precursor of the complex, and then harvesting these from the culture medium using known harvesting methods.

The porphyrin and corrin complexes used in the method of the present invention may, in some cases, have one or more functional substituents such as amine, amide, hydroxy, azo, and acid groups, and may in some cases have a complex stereochemistry. Thus, the complexes may exist in a number of ionized or protonated forms depending upon the pH, etc., of the medium in which they are contained, and may also exist in a number of complexed forms or in an ionized form combined with a counterion. The complexes may also exist in a number of forms which differ only in the spatial arrangement of functional groups. The method of the invention includes all such forms of the complex, and all stereoisomeric forms thereof.

It is also contemplated that the porphyrin- or corrin-metal complex may be immobilized on a solid support such as activated carbon, diatomaceous earth, or glass.

The process of the present invention may take place in the presence of a reducing agent. The reducing agent may be an organic or an inorganic reducing agent. Organic reducing agents include dithiothreitol, dithioerythreitol, mercaptans, and mercaptosugars. Inorganic reducing agents include borohydrides, dithionites, sulfites, phosphites, hypophosphites, and sulfide. Alternatively, in complex environments such as anaerobic soils and sediments, at sufficiently low redox potentials naturally occurring reducing agents are available. A preferred reducing agent is dithiothreitol.

Although the scope of the present invention is not to be limited to any theoretical reasoning, it is believed that the reducing agent is an electron source, and the catalyst is a conveyor of electrons to the nitro- and nitroso- compounds.

The method of the present invention may be used in conjunction with the reduction of various nitro-substituted or nitroso-substituted organic molecules to amino-substituted molecules. Such compounds include, but are not limited to, trinitrotoluene (TNT), 1,3,5-trinitrohexanhydro-1,3,5-triazine (RDX), dinitrotoluenes, and nitrotoluenes. The dinitrotoluenes and trinitrotoluenes may by symmetrical or asymmetrical. The asymmetrical dinitro- or trinitrotoluenes may be sulfonated. Preferably, the method of the present invention is carried out in an aqueous environment, such as an aqueous solution.

The present invention is particularly applicable to the treatment of waste water or soil that is contaminated with nitro-and/or nitroso- substituted compounds, whereby such compounds are reduced in the presence of the catalyst hereinabove described.

A particular example of the application of the method of the present invention is the pre-treatment of waste water streams generated by munitions plants ("pink water") so as to render the waste water amenable to conventional biological waste treatment such as activated sludge treatment. In particular, the method of the present invention may be employed to convert the primary components of pink water, TNT and RDX to less biologically recalcitrant species as a preparation for biological mineralization. The method of the present invention may also be used to treat soil contaminated with nitro- and/or nitroso-substituted organic compounds. It is to be understood, however, that the method of the present invention is not limited to such processes.

The invention will be further described with respect to the following examples; however, the scope of the invention is not to be limited thereby.

EXAMPLE 1

A $Co^{+2}$-hematoporphyrin complex was prepared as follows: 1.5 mg of hematoporphyrin was dissolved in 15 ml of 100 mM Tris buffer, pH 9.0. To this solution was added an equal volume of equimolar $CoCl_2$. The resulting mixture was then incubated at 37° C. for 30 min. in the dark. This solution was then used as a source of $Co^{+2}$-hematoporphyrin.

4-nitrotoluene and 2-nitrotoluene have been used as model compounds for the nitrosubstituted components of pink water. Reaction mixtures were typically prepared as follows:

20 ml of Tris buffer (pH 9.0) was saturated with 2-nitrotoluene or 4-nitrotoluene by sonication at 40° C. for 1 hour. At the end of this time the solution was cooled to room temperature and the organic and aqueous phases separated. The aqueous phase was assumed to be saturated and corresponded to roughly 400–500 ppm nitrotoluene.

Dithiothreitol was used as reducing agent or ultimate source of electrons. 0.8–3.2 mg/ml dithiothreitol was added to this saturated nitrotoluene solution with mixing.

The reaction was initiated by addition of 0.4 ml of the $Co^{+2}$-hematoporphyrin solution described above. The reaction mixture was then quickly dispensed in 2 ml portions to test tubes, purged with nitrogen and incubated at 37° C.

Controls were prepared as above, but without the addition of the $Co^{+2}$-hematoporphyrin solution.

At intervals the reaction was stopped in one or more test tubes by extraction with hexane. Extracts were analyzed by gas chromatogrpahy (HP 5890) with mass spectrometer detector. The chromatographic conditions were:

Column: HP-1 (crosslinked methyl silicone gum-12 m×0.2 mm×0.33 μm film thickness)
Carrier Gas: Helium
Temperature Profile:
  Initial temp. 40° C. (5 min.)
  Rate 5° C./min.
  Final temp. 250° C. (12 min.)
Injection Port Temperature: 250° C.
Transfer Line Temperature: 200° C.

Under these conditions the following retention times were observed:

| Compound | Retention Time (min.) |
| --- | --- |
| 2-nitrotoluene | 12.8 |
| 2-aminotoluene | 10.4 |
| 2-nitrosotoluene | 8.0 |
| 4-nitrotoluene | 14.4 |
| 4-aminotoluene | 10.3 |
| 4-nitrosotoluene | 8.5 |

The following pertinent observations were made in these experiments:

At a dithiothreitol concentration of 3.2 mg/ml, 4-nitrotoluene was completely converted to 4-aminotoluene in less than 10 minutes. At lower concentrations of the reducing agent (1.6 mg/ml), conversion was slower with the accumulation of 4-nitrosotoluene as well as 4-aminotoluene in the reaction mixture.

Conversion of 2-nitrotoluene was slower than that of 4-nitrotoluene at the same concentration of reducing agent. 2-nitrosotoluene was seen as an intermediate in the reduction of 2-nitrotoluene to 2-aminotoluene.

The above example indicates the ability of $Co^{+2}$-porphyrin complexes to catalyze the reduction of nitro- or nitrososubstituted toluenes to the corresponding anilines. The rate of reaction is dependent upon the structure of the nitro or nitrososubstituted compound, the concentration of the reducing agent, the concentration of the complex as well as pH, temperature, etc. The example also indicates that the corresponding nitrosocompounds will accumulate when reaction rates are low or when the reducing agent concentration is limiting. Thus, under actual operating conditions, the contaminated material (waste water, soil, etc.) should be tested to determine the reducing agent concentration required for complete conversion at an acceptable residence time if the nitroso intermediate is particularly toxic or biologically recalcitrant.

EXAMPLE 2

A $Co^{+2}$-hematoporphyrin complex was prepared as follows: 1.5 mg of hematoporphyrin was dissolved in 15 ml of 100 mM Tris buffer, pH 9.0. To this solution was added an equal volume of equimolar $CoCl_2$. The resulting mixture was then incubated at 37° C. for 30 min. in the dark. This solution was then used as a source of $Co^{+2}$-hematoporphyrin.

In this example, 2,4-dinitrotoluene has been used as a model compound of the nitrosubstituted components of pink water. Reaction mixtures were typically prepared as follows:

1.0 ml of Tris buffer (pH 9.0) was saturated and corresponded to roughly 400-500 ppm of 2,4-dinitrotoluene.

Dithiothreitol was used as a reducing agent or ultimate source of electrons. 0.8-3.2 mg/ml dithiothreitol was added to this saturated 2,4-dinitrotoluene solution with mixing.

The reaction was initiated by addition of 0.5 ml of the $Co^{+2}$-hematoporphyrin solution described above. The reaction mixture was then purged with nitrogen and incubated at 37° C.

Controls were prepared as above, but without the addition of $Co^{+2}$-hematoporphyrin solution.

At intervals, samples of the reaction mixtures were analyzed by high performance liquid chromatography (HPLC) using an HP 1090L HPLC with a 10-cm×2.5-mm Hypersil $5\mu$ column. At a dithiothreitol concentration of 3.2 mg/ml, 2,4-dinitrotoluene completely disappeared from the reaction mixture within 10-15 min. 1-Methyl-4-nitroaniline and 2-nitro-3-methylaniline were identified as reaction intermediates; however, the ultimate reaction product was 2,4-diaminotoluene.

It is to be understood, however, that the scope of the present invention is not to be limited to the specific embodiments described above. The invention may be practiced other than as particularly described and still be within the scope of the accompanying claims.

What is claimed is:

1. A process for treating water or solids contaminated with at least one nitro- or nitroso- substituted compound, comprising:
   reducing said at least one nitro- or nitroso- substituted compound in the presence of an effective catalytic amount of at least one of a corrin- or porphyrin metal complex.

2. The process of claim 1 wherein the metal portion of said complex is a metal ion selected from Group IIa, Group IIIa, Group IVa, Group Va, Group VIa, Group VIIa, Group VIII, Group Ib, Group IIb, Group IIIb, and the Lanthanide and Actinide Series of the Periodic Table.

3. The process of claim 2 wherein said metal ion is selected from the class consisting of $Co^{+2}$, $Fe^{+3}$, $Fe^{+2}$, $Ni^{+2}$, $Mo^{+3}$, $V^{+5}$, $Ca^{+2}$, $Ba^{+2}$, $Sr^{+2}$, $Cr^{+3}$, $Cr^{+5}$, $Cu^{+2}$, $Mn^{+2}$, and $Zn^{+2}$.

4. The process of claim 3 wherein said metal ion is $Co^{+2}$.

5. The process of claim 1 wherein said reducing takes place in the presence of a reducing agent.

6. The process of claim 5 wherein said reducing agent is selected from the class consisting of dithiothreitol, dithioerythreitol, mercaptans, mercaptosugars, borohydrides, dithionites, sulfites, phosphites, hypophosphites, and sulfides.

7. The process of claim 6 wherein said reducing agent is dithiothreitol.

8. The process of claim 5 wherein said reducing of said at least one nitro-and/or nitroso- substituted compound with said reducing agent in the presence of a catalyst takes place in an aqueous solution.

9. The process of claim 1 wherein said complex is a porphyrin- metal complex.

10. The process of claim 9 wherein said porphyrin is selected from the group consisting of hematoporphyrin, protoporphyrin, uroporphyrin, and coproporphyrin.

11. The process of claim 10 wherein said porphyrin is hematoporphyrin.

12. The process of claim 1 wherein said complex is a corrin.

13. The process of claim 12 wherein said corrin is selected from the class consisting of vitamin $B_{12}$, vitamin $B_{12b}$, and vitamin $B_{12c}$.

14. The process of claim 1 wherein said at least one nitro- or nitroso- substituted compound is trinitrotoluene.

15. The process of claim 1 wherein said at least one nitro- or nitroso- substituted compound is 1, 3, 5-trinitrohexanhydro- 1, 3, 5-triazine.

16. The process of claim 1 wherein said at least one nitro- or nitroso- substituted compound is a nitrotoluene.

17. The process of claim 1 wherein said at least one nitro- or nitroso- substituted compound is a dinitrololuene.

* * * * *